United States Patent
Copland

(10) Patent No.: US 10,967,239 B2
(45) Date of Patent: Apr. 6, 2021

(54) PITCHING MACHINE AND METHODS OF USE

(71) Applicant: Randall Copland, Auberry, CA (US)

(72) Inventor: Randall Copland, Auberry, CA (US)

( * ) Notice: Subject to any disclaimer, the term of this patent is extended or adjusted under 35 U.S.C. 154(b) by 0 days.

(21) Appl. No.: 16/530,856

(22) Filed: Aug. 2, 2019

(65) Prior Publication Data
US 2020/0038733 A1 Feb. 6, 2020

Related U.S. Application Data

(60) Provisional application No. 62/714,081, filed on Aug. 3, 2018.

(51) Int. Cl.
| | | |
|---|---|---|
| *A63B 69/40* | (2006.01) | |
| *F41B 4/00* | (2006.01) | |
| *G05B 19/042* | (2006.01) | |
| *A63B 69/00* | (2006.01) | |
| *A63B 102/02* | (2015.01) | |

(52) U.S. Cl.
CPC ............ *A63B 69/406* (2013.01); *F41B 4/00* (2013.01); *G05B 19/042* (2013.01); *A63B 69/0002* (2013.01); *A63B 2069/0008* (2013.01); *A63B 2069/402* (2013.01); *A63B 2102/02* (2015.10); *A63B 2225/093* (2013.01); *A63B 2225/50* (2013.01); *A63B 2243/007* (2013.01); *A63B 2243/0095* (2013.01); *G05B 2219/23258* (2013.01)

(58) Field of Classification Search
CPC .............................. A63B 69/406; F41B 4/00
See application file for complete search history.

(56) References Cited

U.S. PATENT DOCUMENTS

| | | | |
|---|---|---|---|
| 1,821,755 A | 3/1929 | Jeter | |
| 2,815,743 A | 12/1957 | Brunderman | |
| 3,009,451 A | 11/1961 | Zone | |
| 3,308,802 A | 3/1967 | Applegate | |
| 4,442,823 A | 4/1984 | Floyd et al. | |
| 5,649,523 A | 7/1997 | Scott | |
| 5,865,161 A | 2/1999 | Bruce | |
| 5,897,445 A * | 4/1999 | Sanders | ............ A63B 24/0003 473/421 |

(Continued)

OTHER PUBLICATIONS

ATEC M3 Baseball Training Machine Product description retrieved on Dec. 26, 2017 from "https://www.academy.com/shop/pdp/atec-m3-baseball-training-machine#repChildCatid=3896130".

(Continued)

*Primary Examiner* — John A Ricci
(74) *Attorney, Agent, or Firm* — Sierra IP Law, PC; William K. Nelson; Mark D. Miller

(57) ABSTRACT

Improved pitching machines capable of providing accurate, repeatable, and various pitches for training or simulation purposes (e.g., batting and catching). The pitching machine of the present invention may be operable to deliver pitches that each have a different predetermined trajectory, location, velocity (speed to target), and rotational velocity with repeatable precision and accuracy. Additionally, the pitching machine may be programmable and capable of simulating a pitch sequence, as thrown by a pitcher in a game situation, which provides a novel and effective tool for training batters.

26 Claims, 9 Drawing Sheets

(56) References Cited

U.S. PATENT DOCUMENTS 6,186,134 B1 2/2001 Battersby et al.
6,440,013 B1 8/2002 Brown

OTHER PUBLICATIONS

Rawling Pro Line 3 Wheel Pitching Machine Product description retrieved on Dec. 26, 2017 from "http://pitchingmachinesale.com/brands/rawlings-pitching-machines/rawlings-pro-line-3-wheel-pitching-machine.html".

Hack Attack Baseball Pitching Machine Product description retrieved on Dec. 26, 2017 from "https://sportsattack.com/store/hack-attack-baseball-pitching-machine/".

* cited by examiner

FIG. 9
FIG. 9A
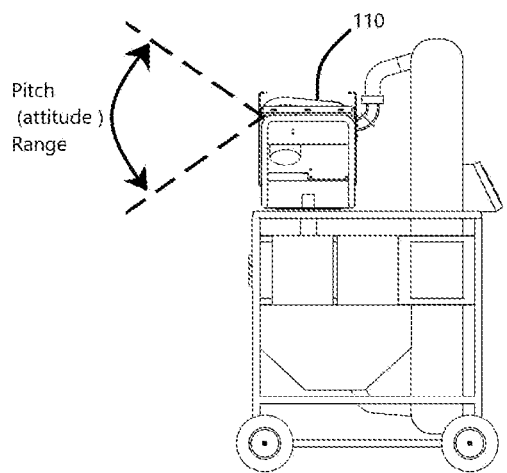
FIG. 9B
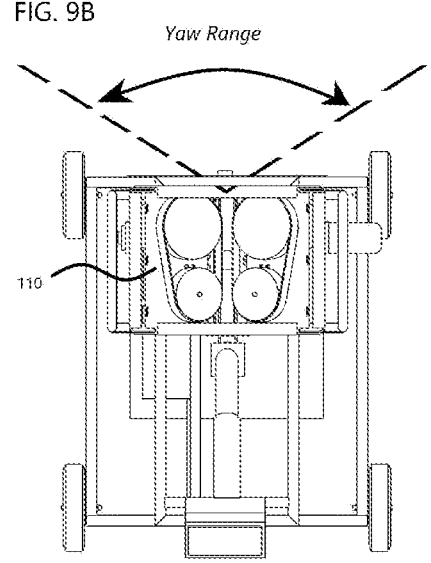
FIG. 9C
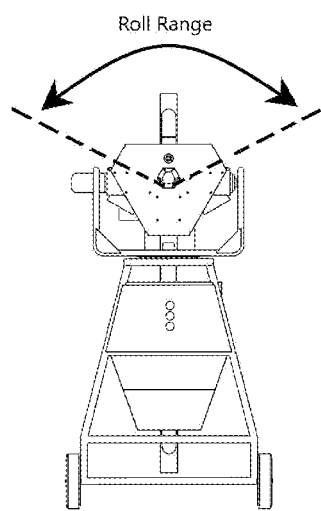

PITCHING MACHINE AND METHODS OF USE

FIELD OF THE INVENTION

The present invention relates to improved pitching machines, and related systems and methods.

DISCUSSION OF THE BACKGROUND

Pitching machines have long been used for propelling, or throwing spherical balls, such as baseballs, softballs, and tennis balls for example, or oval balls such as a football. Primarily pitching machines are used for throwing baseballs and softballs during activities such as batting practice, where the pitching machine is used to simulate a human pitcher. Modern pitching machines are purported to be able throw multiple pitch types, such as fastballs and curveballs. However, the pitches thrown by such pitching machines do not reliably simulate pitches thrown by human pitchers.

Additionally, such pitching machines require time-consuming setup for each type of pitch thrown, and must be reset for each time the pitch type is changed. For instance, if it is desired to throw fastballs to a batter, the pitching machine is setup to throw fastballs. When it is desired to throw another type of pitch to the batter, such as curveballs, the machine is stopped and then re-sets for throwing balls of the new pitch type.

Another disadvantage of conventional pitching machines is that the batter knows exactly what type of pitch is being thrown and can adjust his or her swing and stance for the anticipated speed and location of the pitch. In a game situation, the batter must be prepared for any type of pitch that may be thrown by the pitcher. Thus, pitching machine capable of consecutively throwing different types of pitches, without requiring re-setup for the different type pitches to effectively simulate a game situation, would be advantageous over the prior art.

The existing pitching machines are deficient in providing effective game-simulation training for baseball and softball players, and are in need of improvement. It is therefore desirable to provide novel pitching machines and related methods.

SUMMARY OF THE INVENTION

Embodiments of the present invention provide improved pitching machines, and related systems and methods. The pitching machine of the present invention may be capable of providing accurate, repeatable, and various pitches for training purposes (e.g., batting and catching). The pitching machine of the present invention may be operable to pitch balls that each have a different predetermined trajectory, location, velocity (speed to target), and rotational velocity with repeatable precision and accuracy. Additionally, the pitching machine may be programmable and capable of simulating a pitch sequence, as thrown by a pitcher in a game situation, which provides a novel and effective tool for training batters. Pitch sequences may be pre-programmed and stored in a memory of the pitching machine, and may be executed by instructions provided through an operator interface, such as a touch screen graphical interface, or other interface. The pitching machine may include a programmable throwing apparatus having a novel belt propulsion mechanism, electromechanical pitch (pitch, attitude, and elevation may be used interchangeably herein), yaw (yaw and windage may be used interchangeably herein), and/or roll mechanisms for adjusting the release point and angle of the propulsion mechanism, a mounted or remote graphical interface display allowing the user to select and control pitches, an audio/visual batter signaling system, and a calibrating system for the pitching machine. The terms pitch (attitude), yaw, and roll should be interpreted according to their use in aeronautics, as shown in FIG. 9. Other features and aspects that may be included in the machine are described herein.

Conventional pitching machines are limited in their ability to deliver pitches of different types at different velocities and trajectories. The location accuracy of conventional pitching machines is also inconsistent and unpredictable. The present invention allows for the accurate delivery of various pitch types (e.g., fastballs, curveballs, sliders, sinkers, etc.) with pre-selected speeds and target locations. Each baseball (or softball) pitch has both linear velocity or "speed to target" (i.e., the speed from the machine to the target) and a rotational velocity (i.e., the angular velocity at which the ball spins in flight). Rotational velocities applied to spherical or cylindrical body when immersed in a fluid (e.g., liquid or gas) creates a Magnus effect this causes a pressure differential at location where the ball drags some of the air around the axis of rotation; the pressure differential generates a sidewise force on the object. The pitching machine of the present invention is operable to reliably deliver pitches with both precise speed to target and rotational velocity accurately to a predetermined target. Conventional pitching machines are not able to generate realistic sliders, cutter, and other pitches that have oblique rotational axes. Such conventional pitching machines are limited to rotational axes that are perpendicular to the flight path of the ball. The pitching machine of the present invention is operable to deliver pitches having variously oriented rotational axes that are not perpendicular to the ball's flight path allowing for a variation in the Magnus effect. For instance, the pitching machine of the present invention is able to deliver hybrid pitches (such as sliders and cutters) that have rotational axes that are oblique to the flight of the ball.

The present invention also includes additional benefits over conventional pitching machines. The balls are conveyed along a tunnel-like length of the propulsion belts to create momentum and direction toward a selected target, as opposed to being momentarily compressed between the rotating wheels of a conventional pitching machine. This propulsion method provides more accurately thrown pitches and may reduce wear on balls and increase their life spans.

The programmable pitching machine may include a propulsion mechanism that includes three rotating belts that are spaced at 120° from each other defining a propulsion path for a ball that is a virtual tunnel. The portion of each belt spanning the length of the propulsion path of the ball may be in a range of about 8 inches to about 15 inches (any value or range of values therein, e.g., about 12 inches). The diameter of the propulsion path may be equal to or slightly less than the diameter of the ball to be thrown by the machine (e.g., a standard-sized baseball, standard-sized softball, or other type of sports ball). For example, the diameter of the propulsion path may be from 0 mm to about 2 mm smaller than the diameter of the ball. The propulsion belts may be made of a slightly compressible materials to allow for a tight grip on the ball with a minimal amount of compression in the belt. For example, the belts may be made from vulcanized rubber, or other dense and durable polymeric material. In some embodiments, the belt may be made from a composite material for example, without limitation, a material having a high friction coefficient (e.g., vulcanized rubber) embedded with a material having a lower friction coefficient (e.g., textile, urethane, etc.) to allow for desirable ball slip along the propulsion path and assist in producing the preferred flight path of the ball. In other embodiments each of the driving belts may be comprised of different materials.

The propulsion belts may be electrically driven and may be rotated at variable speeds. The velocity of the propulsion belts may be independently adjusted for imparting a predetermined rotational velocity to the balls conveyed by the propulsion belts through the propulsion path, for altering the speed and spin of the ball. Once a ball is seized between the belts, the ball is rapidly conveyed by the belts and thrown in a predetermined direction at a pre-selected speed to target with a pre-selected spin pattern. The propulsion belts accelerate the ball while constraining its travel along the virtual tunnel of the propulsion path such that the machine can direct the ball with improved directional accuracy in comparison to conventional "wheel-type" pitching machines. Each of the propulsion belts may be positioned on a separate set of pulleys each independently driven and controlled. Each of the propulsion belts may be, for example, tightly positioned over a first driver wheel driven by electrical variable speed motor, and a second idler wheel. The electrical variable speed motor associated with each belt is individually controlled to allow the three belts to be cycled at different speeds, allowing for pitches having different spin patterns and rotational velocities. The electrical variable speed motors may be an AC motor with an inverter or a brush motor, a brushless DC gear motor, a stepper motor, or other appropriate motors.

The three rotating belts may be encompassed in a pitching assembly that includes the three belts and their drive and idler wheels, the variable speed motors associated with each drive wheel, and a frame structure on which the pairs of drive and idler belts are positioned at 120° relative to one another. The pitching assembly may be movably mounted on a frame or platform that allows the pitching assembly to be rotated or moved on one or more axes. In some embodiments, the pitching assembly may be rotatably mounted such that it can pivot on one or more axes. For example, the pitching assembly may be rotatably mounted such that it can pivot on a horizontal axis to allow the pitching assembly to tilt upward and downward (affecting the attitude of the pitching assembly), and it can pivot on a vertical axis to allow the pitching assembly to adjust right-to-left orientation of the propulsion path (affecting the yaw of the pitching assembly). The attitude and yaw of the pitching assembly may be adjusted by electromechanical motors engaged with the pitching assembly. For example, a first electromechanical motor may be engaged with the pitching assembly for pivoting the pitching assembly on a horizontal axis, and a second electromechanical motor may be engaged with the pitching assembly for pivoting the pitching assembly on a vertical axis to adjust the yaw of the pitching assembly. The first and second electromechanical motors may be paired with encoders in electronic communication with the control unit to allow the control unit to closely monitor the real-world position of the pitching assembly. The attitude and yaw adjustments may provide a range of motion operable to deliver pitches that are within and outside of a standard strike zone with the pitching machine at various distances from a targeted zone (e.g., at various distances from home plate, such as standard pitching mound distances of 60.5 ft., 46 ft., and 43 ft.).

The attitude and yaw adjustments by electromechanical motors may be of the actuator type or servo type, or other appropriate motor. The electromechanical motors may be in constant communication with a microcontroller, which may retrieve information from the pitching machine control unit, and may begin adjustments once the axis of propulsion (e.g., flight path of the ball with respect to the target) has been calibrated, the microcontroller may send a voltage using PWM (i.e., pulse width modulation) to rotate a servo motor the desired amount. In some embodiments, the control unit may be operable to send voltages to the servo motor without the use of a microcontroller.

In other embodiments, the pitching assembly may be mounted on a track that allows the pitching assembly to be moved along the track. The pitching assembly may be engaged with a conveying mechanism that includes a drive element (e.g., a chain, a belt, a ball screw, piston, or other flexible or positive drive mechanism) that is also engaged with a driving motor for driving the movement of the drive element. The driving motor may be various kinds of motors (such as an AC motor, a stepper motor, etc.). The drive element may move the pitching assembly along the track to reposition the propulsion path at a different orientation relative to a pitching target. The pitching machine may include one or more encoders that monitor the position of the pitching assembly along the track so that the changing position of the pitching assembly on the track is known. The track may oriented along various axes (e.g., it may be substantially vertical or substantially horizontal in its orientation), and provide a range of motion operable to deliver pitches that are within and outside of a standard strike zone with the pitching machine at various distances from a targeted zone. The single track only allows for adjustment of the propulsion path along one dimension. Adjustment of the path of propulsion along other dimensions may be accomplished by pivoting of the pitching assembly on a rotational axis that is parallel to the track, such that the propulsion path may be aimed anywhere in a large two dimensional X-Y area (e.g. the strike zone and a significant border area surrounding the strike zone) by the combination of moving the pitching assembly along the track and pivoting the pitching assembly on the parallel rotational axis.

In further embodiments, the pitching machine may include both a vertical and a horizontal track along which the pitching assembly may be positioned. For example, the pitching assembly may be mounted on a horizontal track and moved along the track by a conveying mechanism that includes a drive element (e.g., a chain, a belt, a ball screw, piston, or other flexible or positive drive mechanism) that is also engaged with a driving motor for driving the movement of the drive element. The drive element may move the pitching assembly along the horizontal track to various horizontal positions. The pitching machine may include one or more encoders that monitor the position of the pitching assembly along the horizontal track to monitor the horizontal position. The horizontal track may itself be mounted on a vertical track that moves the horizontal track assembly (e.g., the horizontal track, the drive element, and the drive motor) to various vertical positions along the vertical track. The vertical track may include a vertical frame having vertical tracks running along vertical posts thereof to enable and guide the vertical movement of horizontal track assembly. The ends of the horizontal track may be engaged with the vertical tracks within the vertical posts of the vertical frame. The horizontal track assembly may be moved up and down along the vertical tracks by a lift system that includes lift elements (e.g., chains, belts, or other flexible, but non-stretchable device) attached to the ends of the horizontal track assembly and driven by a vertical drive motor, such as an AC motor, servo motor, or other motor type capable of reliably and precisely lifting or lowering the horizontal track assembly. The lift system may be operable to move the pitching assembly up and down with precise position control. The pitching machine may additionally include encoders associated with the vertical drive motor to monitor the vertical position of the horizontal track assembly.

In still further embodiments, the track itself may be rotatable on an axis that is parallel to the track and perpendicular to the propulsion path. For example, the track may be rotated from an axis at or near its center in a range of about 180°, which would allow the pitching assembly to be positioned anywhere in a circular area defined by the diameter and rotation of the track. In such embodiments, the pitching assembly may rotate relative to the track on an axis that is parallel to the propulsion path, such that the pitching assembly is always oriented with the two upper belts collaterally positioned over the propulsion path.

The various encoders and motors (e.g., the motors and encoders for controlling the positioning of the pitching assembly, and for rotating the drive wheels of the rotating belts) may be in electronic communication with a control unit. The control unit may be electronically connected to a graphical display interface device (e.g., a graphical touch-screen interface; or a combination of a keyboard, mouse, and a video monitor, etc.) for selecting a position of the pitching assembly, the type of pitch to be thrown, and the speed to target at which the pitch may be delivered. The control unit may include a processing unit operable to control the variable speed electric motors of the pitching assembly to adjust the velocity of each belt to enable the machine to throw balls of selected pitch types. The control unit may be operable and programmable to deliver a sequence of pitches with different pitch types, predetermined trajectory, speed to target, and rotational velocity, without resetting the machine. Therefore, the pitching machine of the present invention is capable of consecutively throwing balls of different pitch types, which the batter cannot predict, and may be used to more effectively train batters.

The control unit may be programmed with control software that includes algorithms that calculate belt velocity ratios corresponding to a selected pitch type, such that when an operator selects a pitch type (e.g., a fastball), the control software may convert the selections made by a human operator to machine readable instructions that the processing unit can interpret. The processing unit may then activate the belt motors to adjust the individual belt velocities according to the selected pitch type. For example, and without limitation, a "straight fastball" may be selected by the operator (simulating a "4-seam fastball", which is a pitch that rotates around a substantially horizontal axis with backspin), the control software may generate corresponding machine readable instructions, and the processing unit may activate the two upper belt motors to run at a same speed that is slightly slower speed than the bottom belt motor in accordance with the machine readable instructions. Such a velocity ratio between the two top belts and the bottom belt will cause the ball to backspin around a horizontal axis as it approaches the target.

Other pitch types can be selected by the operator and the control unit can control the variable speed motors of the pitching assembly to generate the selected pitch type through the corresponding, programmed velocity ratios of the belts. Non-limiting examples of other pitch types and the programmed relative belt velocities for generating the pitch types are as follows:

a. A vertical curveball ("12-6" curveball)—the processing unit may control the two upper belts to cycle at a higher velocity than the bottom belt to generate a forward spin (also referred to as "top spin") around a horizontal axis.
b. An oblique curveball (e.g., a "11-5" curveball)—the processing unit may control the two upper belts to cycle at a higher velocity than the bottom belt to generate a forward spin (also referred to as "top spin") and also have one of the upper belts cycle at a slightly higher velocity than the other upper belt. This pitch type requires three different belt speeds, where a first top belt cycles a higher velocity than a second top belt, and the second top belt cycles at a higher velocity than the bottom belt. The ratio of the velocities of the two top belts may be adjusted such that the axis of rotation of the pitch is skewed from about 15° to about 45° relative to the vertical. The operator can also select whether the curveball is to simulate a right-handed or left-handed pitcher. For a right-hand simulation, the right, upper belt would be cycled faster than the left, upper belt, and vice versa for a left-hand simulation.
c. Cut fastball—the processing unit may control the bottom belt and one of the upper belts to cycle at a higher velocity than the other upper belt to generate a substantially horizontal spin to generate a fastball that moves laterally during flight. The operator can also select whether the cut fastball is to simulate a right-handed or left-handed pitcher. For a right-hand simulation, the right, top belt would be cycled faster than the left, top belt, and vice versa for a left-hand simulation.
d. Slider—The processing unit may control (1) the bottom belt and a first of the upper belts (the right belt from the perspective of the batter for a right-handed slider, and the left belt for a left-handed slider) to cycle at a first velocity and (2) the second upper belt to cycle at a second higher velocity to generate a slider that moves inferiorly and laterally away from the upper belt cycling at the higher second speed. When the pitching assembly is in the upright position without any roll applied to the assembly, the pitch axis of rotation may be about perpendicular to the direction of the balls flight and skewed about 30° clockwise from the vertical from the perspective of the batter. However, the axis of rotation may be adjusted incrementally by applying differential speeds to the bottom belt and the first upper belt such that their speeds are close, but may be varied in a range of about 1% to about 5% of total rotational speed.

In some embodiments, the control software may include algorithms capable of calculating multiple trajectories for each type of pitch. The velocities of each of the propulsion belts and their relative velocities are determinative of the trajectory and path of the pitch delivered by the pitch assembly. For example, the curved path of a vertical curveball and the vertical drop of the curveball will vary with the magnitude of the ratio between the speed of the upper belts and the lower belt. The higher the ratio is, the larger the second derivative of the curve of the pitch, meaning that the curveball drops vertically faster and farther as it approaches the target than a curveball delivered at the same speed to target at a lower velocity ratio between the upper belts and lower belt.

The control software may also include algorithms for calculating the various positions of the pitching assembly, and the individual rotational speeds of the belts to generate a pitches of a selected type, specified speed, and target location. The algorithms may be calibrated to the particular pitching assembly, including the driving and idler wheels, belts, and propulsion path length, such that a pitch of a particular speed and kind to be thrown at a particular target location can be selected, and the pitch may be delivered to the targeted location with precision and accuracy.

The control unit may also have an internal memory operable to store data related to a particular sequence of pitches for a targeted training. Such a pitch sequence can be stored in a retrievable form (e.g., as data in an electronic database) in the memory, which is in electronic communication with the processing unit of the control unit. The control unit may be operable to store data in the internal memory regarding specific pitches upon command entered by a human operator through the operator interface device.

The graphical display interface may generate a display of a plurality options for both individual pitch types and pre-programmed pitch sequences. The graphical user interface may provide a hierarchy of ordered menus that allow the operator to make specific selections as to the type of pitch, the speed of the pitch, the rotational velocity of the pitch, whether the pitch should have left hand or right hand orientation, and the targeted location to which the pitch is to be delivered by the pitch assembly. The control software may be programmed to provide the hierarchical menu structure, providing options associated with specific pitch characteristics. The control software then translates the operator's selections to corresponding operation commands that are sent to the control unit to control the cycling speed of each individual pitch belt and the motors controlling the position of the pitching assembly (e.g., servo motors).

The control software may store the pitch characteristics of each pitch type in a control unit memory (e.g., list, table, directory), the control unit memory may store a set of values which correspond to the RPM (e.g., one rotation of the pulley per minute). The RPM may vary for each driving motor to achieve the desired pitch characteristics, thus each motor RPM may have a different corresponding value in control unit memory. A corresponding value may consist of a specific voltage applied to each individual motor (e.g., DC motor, AC motor). When a user has selected the specific pitch characteristics the control unit processor may command a user interface to display a pitch speed (i.e., net velocity) and a user may opt. to have the user interface display the voltage applied to each motor. In some embodiments, the RPM may be associated with an AC power frequency to variate the rotational speed. In some embodiments the speed of the belt may be calculated using optical technology (e.g., IR Infrared sensor) if there is a deviation from the RPM and the belt speed the control unit may adjust the motor inputs to account for belt slip and may prompt the user that adjustments to the corresponding pulley must be made. In another aspect of control unit memory, an array of RPM values and time values for a single pitch, the RPM value would be applied to the driving motor at the corresponding time value.

For example, the user may create pitches through the graphical display interface through making various selections from a menu presented through the graphical display interface. These menu may allow the user to select one or more of (1) the pitch type (e.g., 4-seam fastball, 2-seam fastball, cut fastball, curveball, slider, etc.), which may define the rotational speed ratios between the belts, (2) the velocity, (3) the rotational velocity of the pitch, which governs the amount of deflection in the flight path of the ball as it travels to the target, (4) whether the pitch should have left hand or right hand orientation (e.g., does the user want the pitch to emulate a right-handed or left-handed pitcher), and (5) the target location of the pitch relatively to the strike zone (e.g., where the user wants the pitch to be located when it reaches the plate). The user may have the option to have the pitching machine throw a test pitch to determine whether the pitch matches the user's desired pitch. The user may then save the pitch to the internal memory of the control unit, or make adjustments to the one or more of the settings of the pitch (e.g., rotational velocity, target location, etc.), and retest the pitch. This process may be continued until the user is satisfied with the pitch settings and then save the pitch to the internal memory of the control unit. A database of pre-programmed pitches may be built in this manner. If the user desires to make further adjustments to a saved pitch, the menu may give the option to further adjust a pitch, the pitch settings would be retrieved from the database and the one or more settings of the pitch may be adjusted and the database may be updated with the pitch parameters.

Thus, the operator may use the graphical display interface to create, test, and save pitches into a library. The control software may be operable to provide selectable commands through the graphical display interface that direct the processing unit to store specific pitch characteristics ("user-generated pitch records") as retrievable data in the internal memory, such that the operator can build a library of pitches to use in training batters and/or catchers, including building pitch sequences from the user-generated pitch records. The user-generated pitch records may specify the pitch type the (e.g., straight fastball, 12-6 curveball, etc.), the speed to target, the rotational velocity, whether the pitch should have left hand or right hand orientation, and the position of the pitching assembly for delivering the pitch to a specific target location. Each user-generated pitch record may be retrievable from a database accessible through the graphical display interface. When a user-generated pitch record is selected from the database, the pitch characteristics may be displayed on the graphical display interface, and may include graphical representations of the pitch location relative to a target strike zone and a the flight path of the pitch from the pitching machine to the target. During operation of the pitching machine, the operator may select pitches to be delivered to a batter or catcher through the graphical interface display, including from user-generating pitch records and/or simply specifying the desired pitch characteristics.

The operator may build pitch sequences of various numbers of pitches from user-generated pitch records and save the pitch sequences to allow the operator reuse the pitch sequences as desired. The control software may be operable to provide selectable commands through the graphical display interface that direct the processing unit to store specific pitch sequences as retrievable data in the internal memory, such that the operator can build a library of pitch sequences to use in training batters and/or catchers. Once the pitch sequence is programmed by the user, the user can instruct the control unit to execute the pitch sequence through the graphical display interface. The operator can also command the processing unit to generate random pitch sequences from the user-generated pitch records. The pitching sequence may be stored in the computer memory as a list which points to a table location for the pitch parameters, and a voltage may be sent to each of the driving electric motors. In some embodiments, the control software may be operable to store time characteristics for each of the driving motors, time characteristics are operable to enable lag (e.g., start the final driving motor when the ball is at a specific location on the propulsion path) and stage (e.g., linearly increase the speed of the belt) the driving motor at a specified time to achieve the desired pitch characteristics.

In some embodiments, the control unit may be in electronic communication with a mobile-computing device, which is operable to function as a graphic display interface for the pitching machine and allow the operator to enter selections and commands select pitches and pitch sequences to be delivered by the pitching machine. The mobile computing device may include a user interface (e.g., a touchscreen), a processing unit (e.g., a microprocessor), an operating system, computer readable memory, a wireless communication device (e.g., a radio frequency (RF) capable device) to enable wireless communication with control unit, and other components. The mobile computing device may include compatible software operable to provide machine readable instructions to the control unit. In such embodiments, the control unit may include a wireless communication device (e.g., a radio frequency (RF) capable device) to enable wireless communication with the mobile computing device, and other components. The control unit may be programmed with network hosting software for receiving wireless data from the mobile computing device. The control unit's wireless communication device may be operable to transmit and receive data from one or more mobile computing devices via radio channel, WiFi, Bluetooth, WLAN, WiMax, 3G/4G cellular radios, and/or other wireless data communication connections. The control unit may have a receiver for interpreting (e.g., phase modulation) the wireless data; accordingly the control unit may also have a transmitter for returning data from the control unit.

The pitching machine may include a calibration system to provide a reference point from which the control software may properly calculate the attitude and yaw of the pitching assembly to enable accurate delivery of pitches to the target area. The calibration system may include a laser emitting device and a calibration target. The laser emitting device may be mounted on the pitching assembly, e.g., central area of the pitching assembly. The calibration target may be movable target structure that can be placed at a center of a target location. For example, the calibration system may be configured such that the calibration target is to be placed at the front center portion of home plate, and the position of the pitching assembly may then be adjusted until the laser emitted from the laser emitting device strikes the target of the calibration target. The control unit may be operable to allow the human operator to adjust the attitude and yaw through the graphical display interface until the laser hits the calibration target, and then enter a calibration command to set a central calibration point allowing the control unit to deliver pitches to the target location. Other calibration systems are contemplated within the scope of the present invention as well.

The pitching machine may include additional mechanical and structural elements that enable the combination of the pitching assembly and processing unit to deliver pitches accurately and reliably. The pitching assembly of the present invention may be removably coupled to a base. The base may be a stable and rigid frame of sufficient structural strength to support the weight and movement of the pitching assembly such that the base does not tip or rock during operation of the pitching assembly. The base may support the pitching assembly a desired distance above the ground. The connection between the pitching assembly may be vertically adjustable to simulate pitchers of different heights. The base may include lockable wheels, casters, or other motion devices to allow the base to be easily moved. In some embodiments, vertical adjustments may be made with a rack and pinion mechanism controlled by a motor (e.g., stepper, linear servo). In another embodiment, vertical adjustments may be made by the user and a linear adjustment mechanism (e.g., slot and pin, ratcheting rack, etc.) may be used to adjust the height of the pitching mechanism and the user interface may be operable to prompt the user of the current location of the pitching mechanism.

Several mechanical elements for facilitating the operation of the pitching assembly may be mounted on the base, including a ball chute and release mechanism, a ball elevator, and a ball hopper. The pitching machine may include ball feed chute that delivers balls to the rear of the propulsion belts. The feed chute has an outlet positioned to deliver balls into the space between the three propulsion belts. When a ball is released from the distal end of the feed chute, the ball falls through a distal outlet and is seized between the proximal ends of the three propulsion belts. The ball is then rapidly conveyed by the propulsion belts through the propulsion path. The ball is then propelled, or thrown, from the pitching assembly to a predetermined target.

A ball release mechanism may be positioned at or near the distal end of the feed chute to control the delivery of balls from the chute to the pitch belts. The release mechanism may be an electromechanical device mounted on the feed chute, such as a linear actuator (e.g., a solenoid) or other electromechanical actuator. The release mechanism may include a retractable element that obstructs passage of a ball through the feed chute beyond the release mechanism until the retractable element is retracted from the feed chute. The electromechanical release device may be in electronic communication with the control unit. The control unit may send a signal to activate the electromechanical release device after a pitch is selected by an operator at the operator interface. There may be a programmed delay between the pitch selection and the activation of the electromechanical release device to give the batter or catcher to whom the pitch is to be thrown a reasonable amount of time to prepare for the pitch (e.g., 2 to 5 seconds). The delay between pitch selection and the retraction of the release device may be adjustable through the graphical display interface. Also, the control unit may be operable to deliver a pre-programmed sequence of pitches with pre-determined inter-pitch delays. The sequence of pitches may include a regular interval between pitches (e.g., 3 to 10 seconds) to allow the batter or catcher to gather himself and prepare to receive the next pitch. Thus, the processing unit may delay activation of the release device for the length of the pre-determined interval between pitches.

The pitching machine may also include an operator signal mechanism to alert the batter or catcher receiving the pitch that the pitch is about to be delivered. The operator signal mechanism may include audio and/or visual signals. For example, and without limitation, one or more LED lights and a siren or other audible mechanism may be mounted on the anterior portion of the base facing the target, such that the light and sound is easily perceived by the batter or catcher receiving the pitch. Also, other signals may be provided to the batter or catcher, and/or the operator. Signals with different patterns may be used to indicate different conditions of the machine. For example, the operator signal mechanism may include individual signal patterns for (1) indicating that a pitch is about to be delivered, (2) indicating that a pitch sequence is initiating, (3) indicating that a sequence of pitches has ended, and (4) indicating that the pitching machine has suffered a malfunction. The control unit may be in electronic communication with the operator signal mechanism and control the length and pattern of one or more signals generated by the signal mechanism. The control unit may be operable to activate the signal mechanism to generate various signals based on pre-programmed signal patterns associated with different operational conditions of the pitching machine, such as those mentioned above.

The pitching machine may include structures to deliver balls into the feed chute. The pitching machine may include a ball hopper or container mounted on the base and a ball elevator to deliver balls to the feed chute. The hopper may provide a large number of balls to the pitching assembly for continuous use for a substantial number of pitches without the need to reload the hopper. The hopper capacity facilitates long pitch sequences for training purposes. The hopper may be manually loaded or may be paired with a ball conveying system operable to deliver balls to the hopper. The hopper may be mounted on the base below the pitching assembly to allow the operator to fill the hopper without having to lift balls or containers of balls at or above the shoulders, lessening the difficulty of loading the hopper. In some examples, the pitching machine may be installed in a facility having a ball collection and conveying system that collects previously pitched balls (e.g., by a sloped floor/funnel type collection system) and conveys them by conveying belt or track to the hopper.

The hopper may include a motor-driven indexer wheel at the bottom of the hopper which may facilitate the feeding of balls into a delivery track or tube that may feed balls to a ball elevator. The activation of the electrical indexer wheel motor may be controlled to load the delivery track or tube when the ball elevator is active, thereby providing balls to the elevator when balls are needed for the pitch assembly. An elevator sensor may be positioned at or near the end of the track or tube. This sensor may control the indexer in the bottom of the hopper to make sure there are balls available to the elevator. The elevator sensor may be in electronic communication with the control unit and may indicate to the control unit that no ball is present at the end of the track or tube, and the control unit my in turn activate the motor of the indexer in order to feed balls into the track or tube to make them available to the elevator. In other examples, the elevator sensor may have an independent electronic switching system in direct electrical connection with the motor of the indexer that directly activates the motor when the sensor detects that no ball is present.

The ball elevator receives balls from the delivery track or tube, and lifts and delivers them to the feed chute. The ball elevator may include a cycling conveying belt on a vertical or substantially vertical track. The belt may be cycled around the track by one or more sprockets driven by an electric motor (e.g., an AC or DC motor) that is in electronic communication with the processing unit. The processing unit may activate and de-activate the elevator based on the activation of the pitching machine and one or more sensor signals indicating whether the pitching machine is properly working, whether the feed chute is full, etc. The ball elevator may operate continuously while the pitching machine is in use until the feed chute is full. The feed chute may include a proximity sensor at a proximal end thereof into which the ball elevator deposits balls. The proximity sensor may be positioned such that it detects the presence of a ball in the proximal-most position of the feed chute. The feed chute may have a delivery gate that controls the release of a ball into the propulsion path. The sensor may be present at the delivery gate. The delivery gate sensor may be in electronic communication with the control unit. For example, if no ball is present at the delivery gate, the sensor will indicate to the control unit that no ball is present, and the control unit will activate the elevator in order to provide a ball to the delivery gate. Alternatively, the sensor may send a signal to the processing unit when a ball is present at the delivery gate. The processing unit may be programmed to then de-activate the indexer wheel and the ball elevator in response to the signal from the delivery gate sensor. Once the sensor signal ceases, the control unit may send signals re-activating the driver motors for the indexer wheel and the ball elevator. In other examples, the delivery gate sensor may have an independent electronic switching system for the elevator having a motor that is activated directly by sensor.

Selected exemplary embodiments of the pitching machine of the present invention are provided below. It is to be understood that the embodiments are exemplary only, and do not limit the scope of the invention.

In one aspect, the present invention relates to a pitching machine, comprising a pitching assembly having a propulsion mechanism having at least three independently controlled propulsion belts arranged around a substantially circular propulsion path having a pre-determined diameter equal to a sports ball, a substantially horizontal axis of rotation allowing the attitude of the pitching assembly to be adjusted, and a substantially vertical axis of rotation allowing the yaw of the pitching assembly to be adjusted; a base on which the pitching assembly is mounted; a ball conveying system operable to deliver a plurality of the sports ball to the pitching assembly; and a control unit operable to control the cycling velocity of the at least three independently controlled propulsion belts, such that each belt may be cycled at a different speed. The pitching machine may include three belt driving motors, each in mechanical communication with one of the propulsion belts and operable to cycle the propulsion belts at independent speeds, the three belt driving motors being in electronic communication with the control unit.

The pitching machine may further include a substantially horizontal axel member that allows the pitching assembly to rotate on the substantially horizontal axis. The pitching machine may further include an attitude motor in mechanical communication with the substantially horizontal axel member and operable to rotate the axel member to adjust the attitude of the pitching assembly, the attitude motor being in electronic communication with the control unit. The pitching machine may further include a substantially vertical axel member that allows the pitching assembly to rotate on the substantially vertical axis. The pitching machine may further include a yaw motor in mechanical communication with the substantially vertical axel member and operable to rotate the axel member to adjust the yaw of the pitching assembly, the yaw motor being in electronic communication with the control unit.

The pitching machine may include a graphic display interface, and control unit software operable to display a menu of pitch characteristics on the graphic display interface and to receive selections made by a human operator through the graphic display interface. The selectable pitch characteristics may include one or more of pitch type, speed to target, rotational velocity, simulated arm angle, and target location. The control unit software may be operable to direct a processing unit of the control unit to activate the belt driving motors to cycle the propulsion belts at independent speeds in accordance with pitch characteristics selected by the human operator. The control unit software may be operable to direct a processing unit of the control unit to activate the attitude motor to adjust an attitude of the pitching assembly in accordance with pitch characteristics selected by the human operator. The control unit software may be operable to direct a processing unit of the control unit to activate the yaw motor to adjust a yaw of the pitching assembly in accordance with pitch characteristics selected by the human operator.

The pitching machine may include a calibration system including a laser emitting device and a calibration target. The laser emitting device is mounted on the pitching assembly, and the calibration target is configured to be placed at a center of a target location. The control unit may be operable to allow the human operator to adjust the attitude and yaw through the graphical display interface until the laser hits the calibration target placed at the center of the target location, and then enter a calibration command to set a central calibration point allowing the control unit to deliver pitches to the target location.

The pitching machine may further include a signaling system that includes visual and/or audio signal emitters to alert a human operator of one or more operating conditions of the pitching machine. The signaling system is operable to alert a batter or catcher that a pitch will be imminently delivered by the pitching machine. In some embodiments, the signaling system may comprise a plurality of lights wherein each light of the plurality of lights comprises a different color, enabling the signaling system to provide different signals to a batter or catcher. In other embodiments, the signaling system may comprise a plurality of lights, and a sound emitter (i.e., a speaker). In yet other embodiments, the signaling system may comprise a screen operable to provide a visual representation of a pitcher winding up to throw a pitch, the visual representation releasing the ball at the same time that a pitch is thrown by the pitching assembly. The signaling system may receive an array of voltage from the control unit, an array of voltages is associated with the time for the ball to enter and exit the propulsion path. The control unit processor may calculate the array of voltages from the time parameter defined by the user.

The pitching machine may further include a mobile computing device in wireless electronic communication the control unit, the mobile computing device having a second control unit software. The second control unit software may be operable to direct a processing unit of the control unit to activate the belt driving motors to cycle the propulsion belts at independent speeds in accordance with pitch characteristics selected by the human operator. The second control unit software may be operable to direct a processing unit of the control unit to activate the attitude motor to adjust an attitude of the pitching assembly in accordance with pitch characteristics selected by the human operator. The second control unit software may be operable to direct the processing unit of the control unit to activate the yaw motor to adjust a yaw of the pitching assembly in accordance with pitch characteristics selected by the human operator.

In a second aspect, the present invention relates to an apparatus for throwing balls, comprising a propulsion system comprising at least three belts oriented around a propulsion path, the belts each coupled with a driving pulley, wherein each of the driving wheels is mechanically connected to an independently controlled driving motor; a control unit in electronic communication with each of the independently controlled driving motors, and operable to control each of the independently controlled driving motors to rotate the corresponding driving pulley at different rotational velocities; and a control software operable to allow a human operator to select a plurality of pitch characteristics through a graphical display interface, and provide computer readable instructions to a processing unit of the control unit, the control unit being operable to activate the independently controlled driving motors to rotate the driving wheels in accordance with the pitch characteristics selected by the operator. The propulsion path may be at least six inches in length and each of the three belts run along the entire length of the propulsion path. The belts may be spaced apart from one another along the propulsion path to create a substantially circular propulsion path having a diameter about equal to the diameter of a standard sized sports ball. The standard sized sports ball may be a baseball, a softball, a tennis ball, a soccer ball, a football, a volleyball, or a cricket ball.

The apparatus may include an orientation system operable to orient the pitching assembly such that the propulsion path is positioned to deliver a ball to a specific target location in a pre-defined area. The orientation system may include a first axial rotation mechanism for rotating the pitching assembly around a substantially horizontal axis such that the pitching assembly can be adjusted to different attitudes s in accordance with the plurality of pitch characteristics selected by the operator, and an attitude motor in mechanical communication with the substantially horizontal axis mechanism for rotating the pitching assembly, the attitude motor being in electronic communication with the control unit. The orientation system includes a second axial rotation mechanism for rotating the pitching assembly around a substantially vertical axis such that the pitching assembly can be adjusted to different yaws in accordance with the plurality of pitch characteristics selected by the operator, and a yaw motor in mechanical communication with the substantially vertical axis mechanism for rotating the pitching assembly, the yaw motor being in electronic communication with the control unit.

In a third aspect, the present invention relates to method of delivering pitches from a pitching machine to a batter or catcher, comprising using a graphical display interface to select a plurality of desired pitch characteristics; a pitching machine control software translating the selected plurality of desired pitch characteristics to computer readable instructions provided to a processor of a control unit; the control unit activating a plurality of propulsion belt driving motors in accordance with the computer readable instructions, each of the propulsion belt driving motors being mechanical communication with one of a plurality of propulsion belts arranged in a pitching assembly around a propulsion path for propelling a ball toward a target area, wherein the control unit is operable to activate the plurality of belt driving motors to cycle the propulsion belts at independent velocities; and delivering the ball into the propulsion path to be contacted by the plurality of propulsion belts and propelled through the propulsion path, out of the pitching machine, and toward the target area. The computer readable instructions may include instructions for adjusting the attitude of the pitching assembly, and further comprising the control unit activating an attitude motor to adjust the attitude of the pitching assembly by pivoting the pitching assembly on a substantially horizontal axis. The computer readable instructions may include instructions for adjusting the yaw of the pitching assembly, and further comprising the control unit activating a yaw motor to adjust the attitude of the pitching assembly by pivoting the pitching assembly on a substantially vertical axis. The pitch characteristics may include one or more of pitch type, speed to target, rotational velocity, simulated arm angle, and target location.

The pitching machine control software may calculate the operational speed of the propulsion belt drive motors, the attitude of the pitching assembly, and the yaw of the pitching assembly in accordance with the pitch type, the speed to target, the rotational velocity, the simulated arm angle, and the target location. The pitching machine control software may be operable to save the selected plurality of desired pitch characteristics as a user-generated pitch record in a machine readable memory. The generating and saving a plurality of user-generated pitch records. The pitching machine control software may be operable to generate a sequence of pitches from the user-generated pitch records. The pitching machine control software may be operable to generate a random sequence of user-generated pitch records, converts each of the user generated pitch records to machine readable instructions, and delivers the machine readable instructions to the control unit in the random sequence, the control unit activating (1) the propulsion belt motors to adjust the cycling speed of the propulsion belts, (2) the attitude motor to adjust the attitude of the pitching assembly, and (3) the yaw motor to adjust the yaw of the pitching assembly in accordance with each of the user-generated pitch records. The pitching machine control software may be operable to generate a random sequence of pitches having pitch characteristics randomly selected from acceptable values entered by the operator through the graphical display interface, the acceptable values including selected pitch types, a range of acceptable speeds to target for each pitch type, a range of acceptable rotational speeds for each pitch type, one or more selected arm angles, and one or more selected sub-regions within a addressable target region.

The method may include calibrating the pitching machine to provide a predictable pitch location for each pitch delivered by the pitching assembly. Calibrating the pitching machine may include positioning a calibration target in a center of a target area, orienting a laser emitting device mounted on the pitching assembly such that a laser emitted therefrom strikes the calibration target and entering a calibration command through the graphical display interface.

Other implementations and designs of the pitching machine are contemplated within the scope of the present invention. For example, and without limitation, the pitching machine may be configured for various types of balls and round objects, such as tennis balls, soccer balls, footballs, volleyballs, etc. In the case of softballs, the belt arrangement of the pitching assembly may be rotated 180° around the propulsion path, such that the underhanded pitching style for fast pitch softball can be simulated. Other alterations and applications of the conveyor systems described herein are within the scope of the present invention.

Further objects and aspects of the present invention will be apparent from the description provided herein.

BRIEF DESCRIPTION OF THE DRAWINGS

FIG. 9A provides a view of the present pitching machine and variation in pitch according to an embodiment of the present invention.

FIG. 9B provides a view of the present pitching machine and variation in yaw according to an embodiment of the present invention.

FIG. 9C provides a view of the present pitching machine and variation in roll according to an embodiment of the present invention.

DETAILED DESCRIPTION

Figure 1:
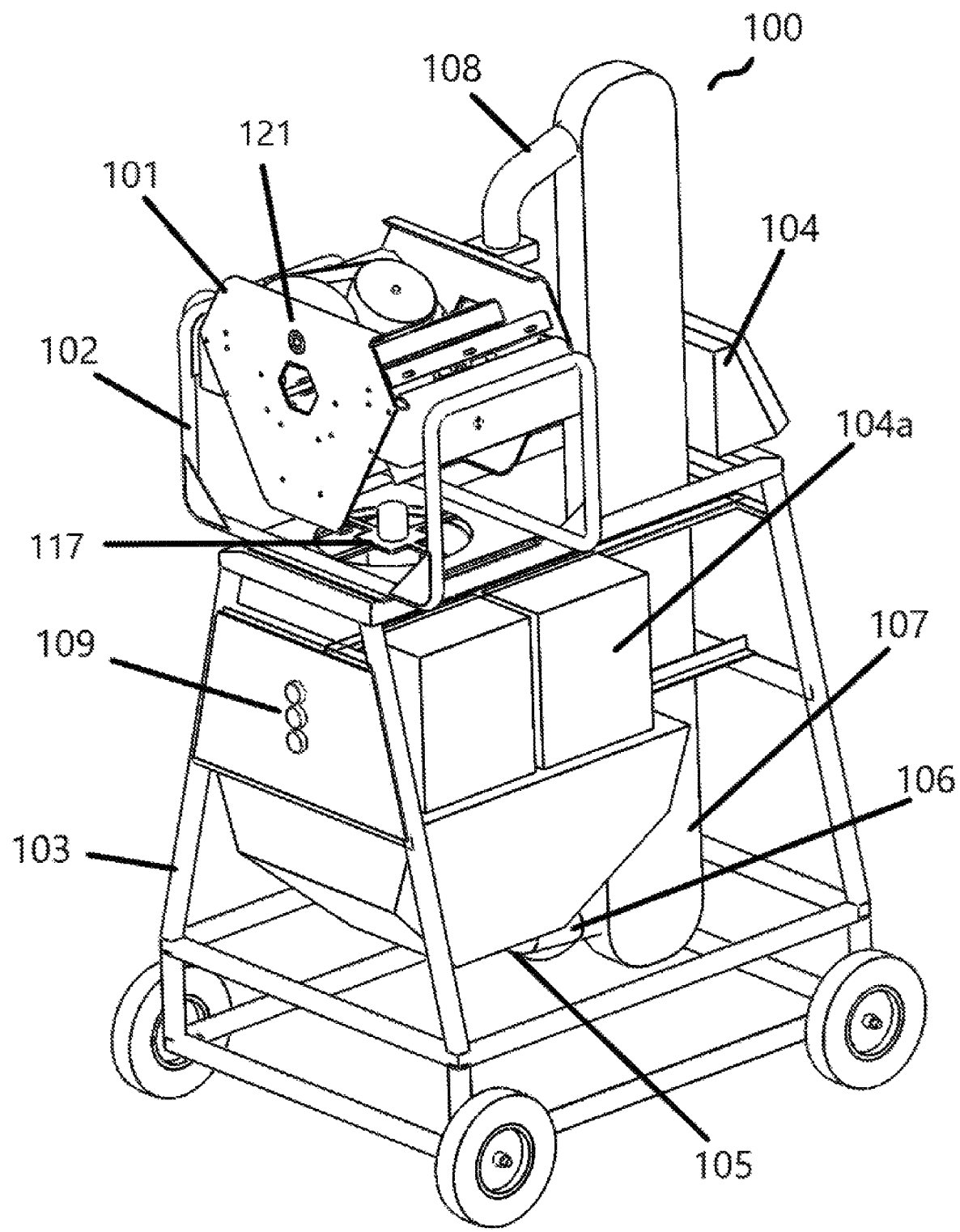
FIG. 1 is a perspective view of a pitching machine according to an embodiment of the present invention.

Reference will now be made in detail to certain embodiments of the invention, examples of which are illustrated in the accompanying drawings. While the invention will be described in reference to these figures and certain implementations and examples of the embodiments, it will be understood that such implementations and examples are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. References to various features of the "present invention" throughout this document do not mean that all claimed embodiments or methods must include the referenced features. It will be apparent to one skilled in the art that the present invention may be practiced without these specific details or features.

Reference will be made to the exemplary illustrations in the accompanying drawings, and like reference characters may be used to designate like or corresponding parts throughout the several views of the drawings.

The present invention relates to a pitching machine able to deliver pitches of various types and having improved accuracy. More specifically, the present invention pertains to a programmable, smart pitching machine operable to deliver pitches with precisely selected characteristics and accurate deliver to a chosen target, and to be programmed to deliver a custom or computer-generated sequence of pitches to a batter or catcher.

Figure 2:
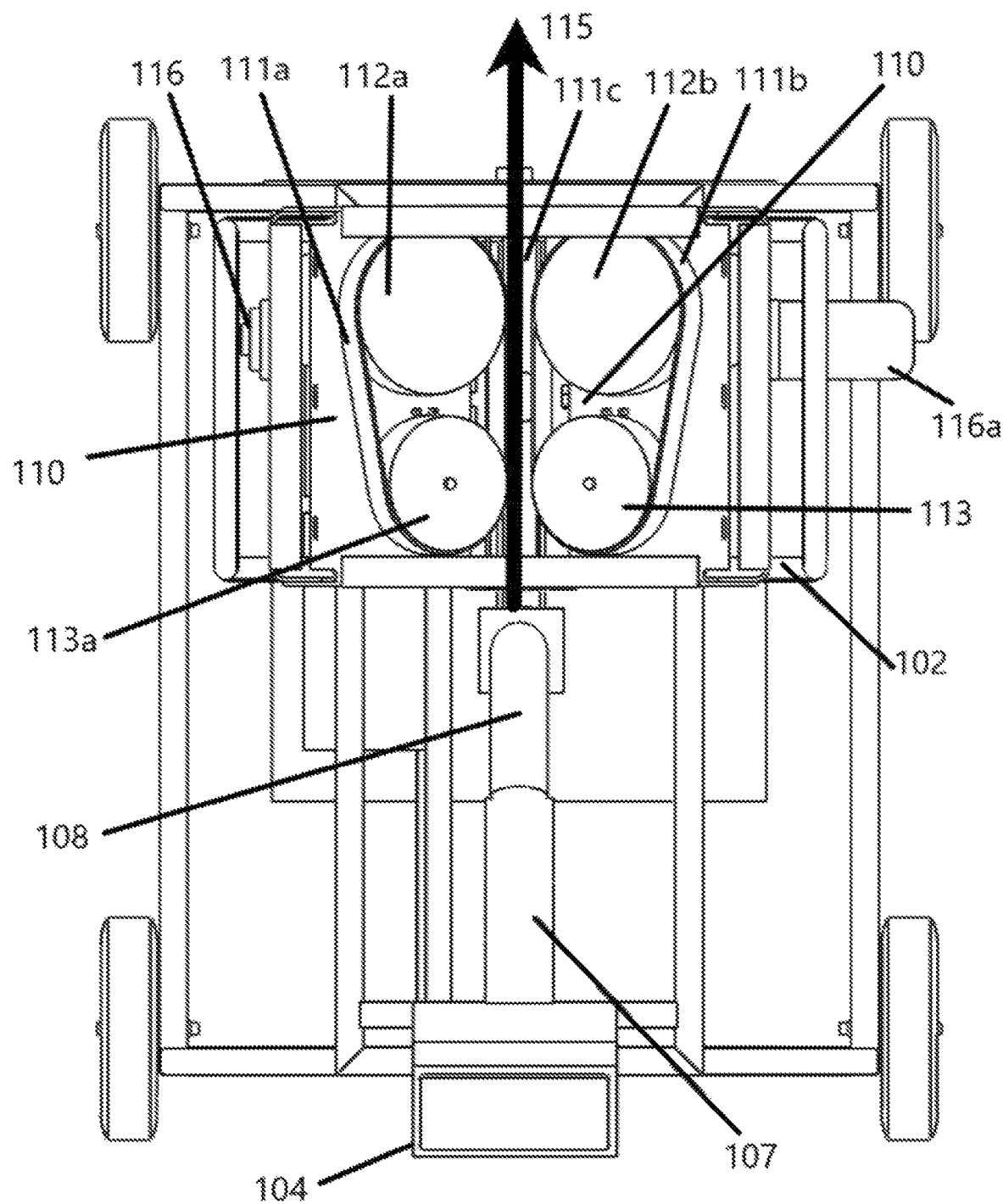
FIG. 2 is an overhead view of a pitching machine according to an embodiment of the present invention.
Figure 3:
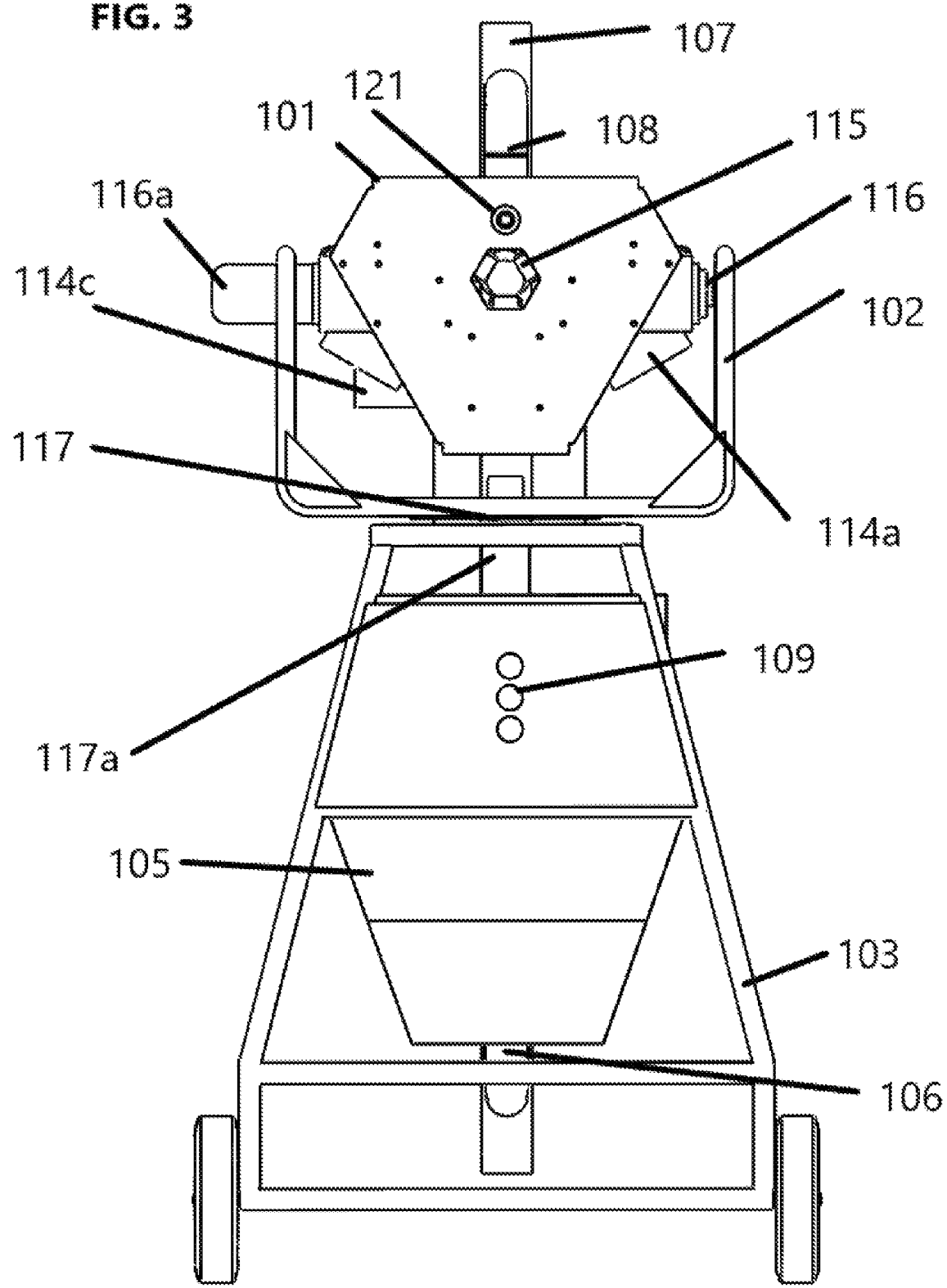
FIG. 3 is a view of the front of a pitching machine according to an embodiment of the present invention.
Figure 4:
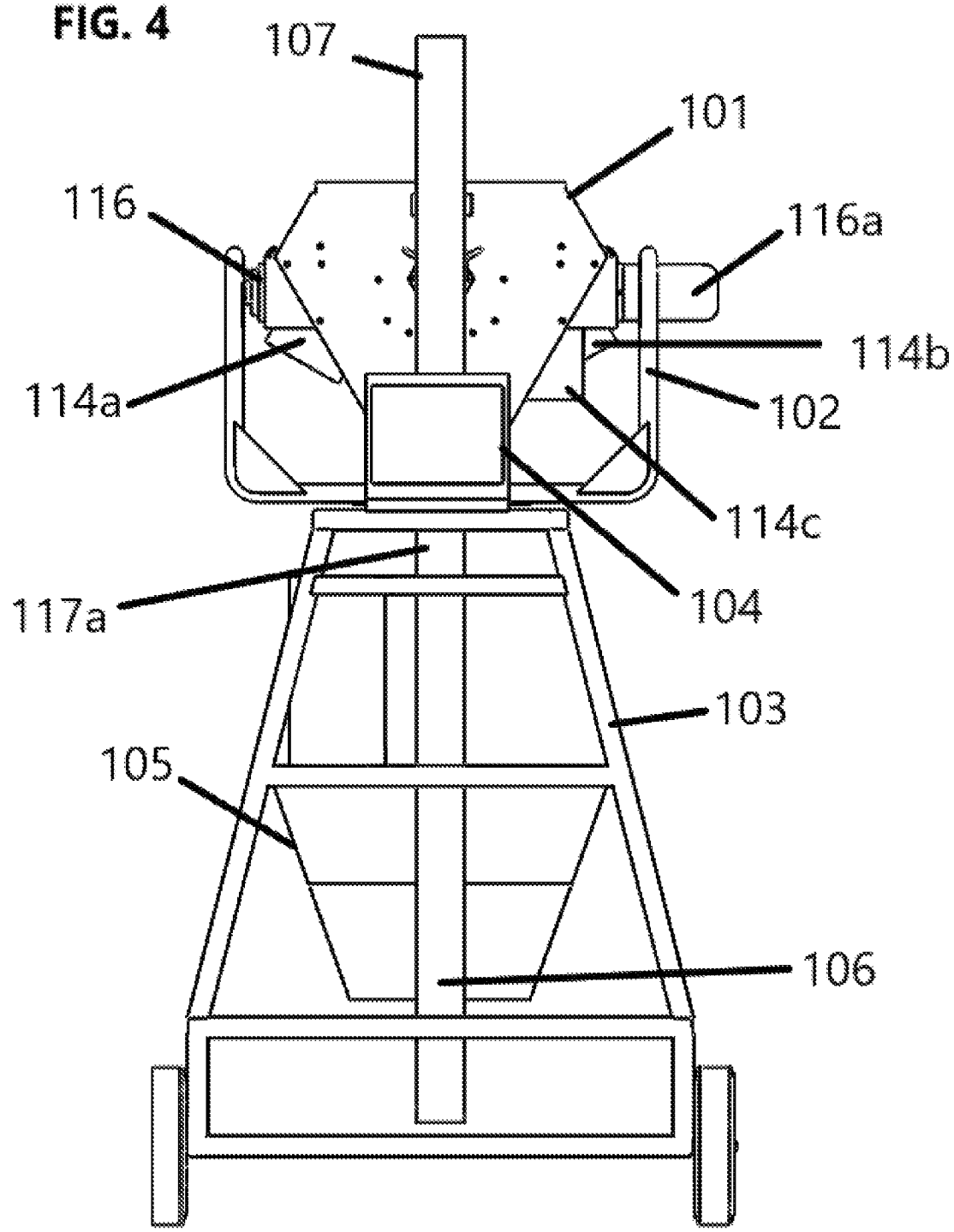
FIG. 4 is a view of the back of a pitching machine according to an embodiment of the present invention.
Figure 5:
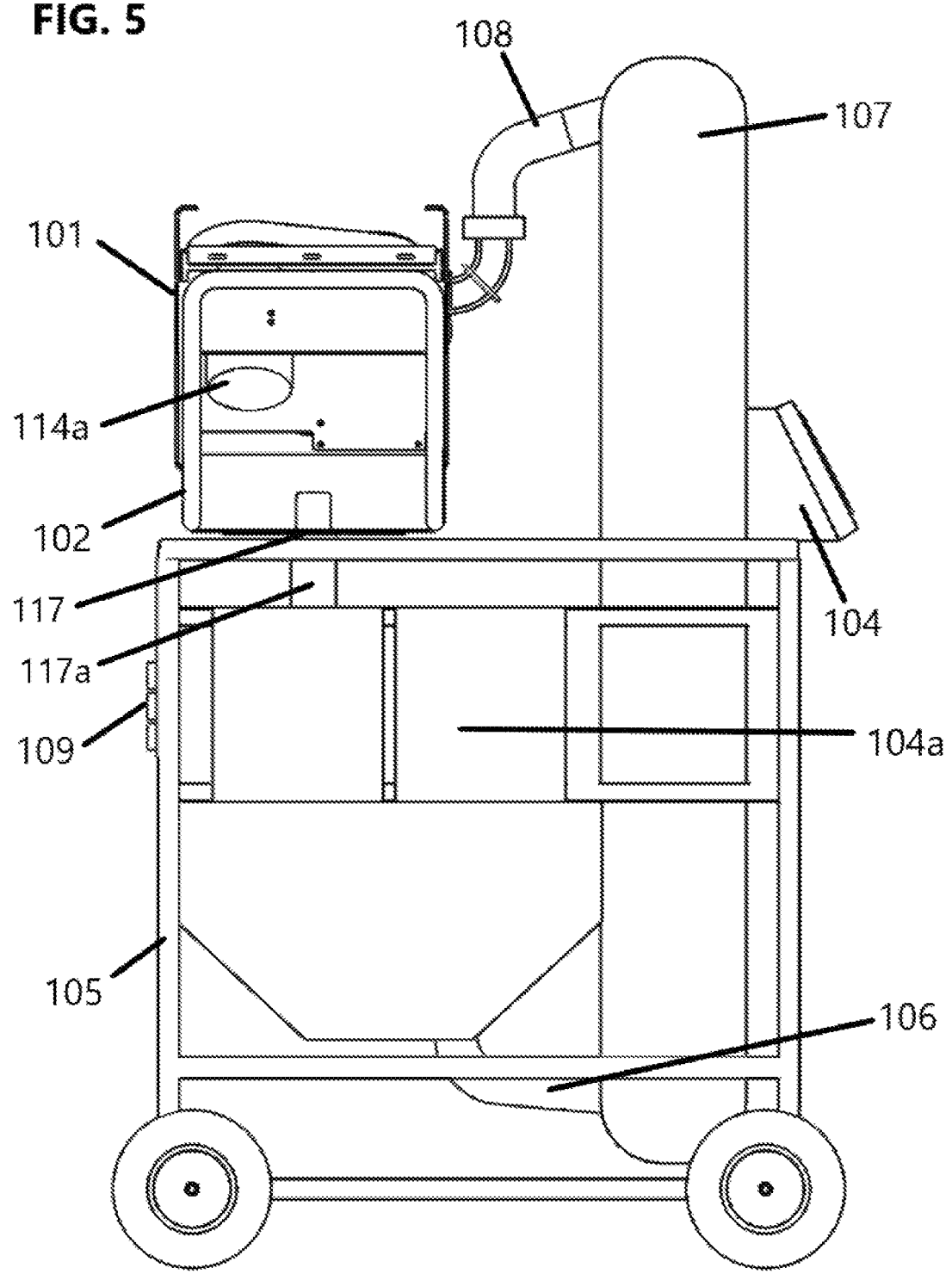
FIG. 5 is a side view of a pitching machine according to an embodiment of the present invention.
Figure 6:
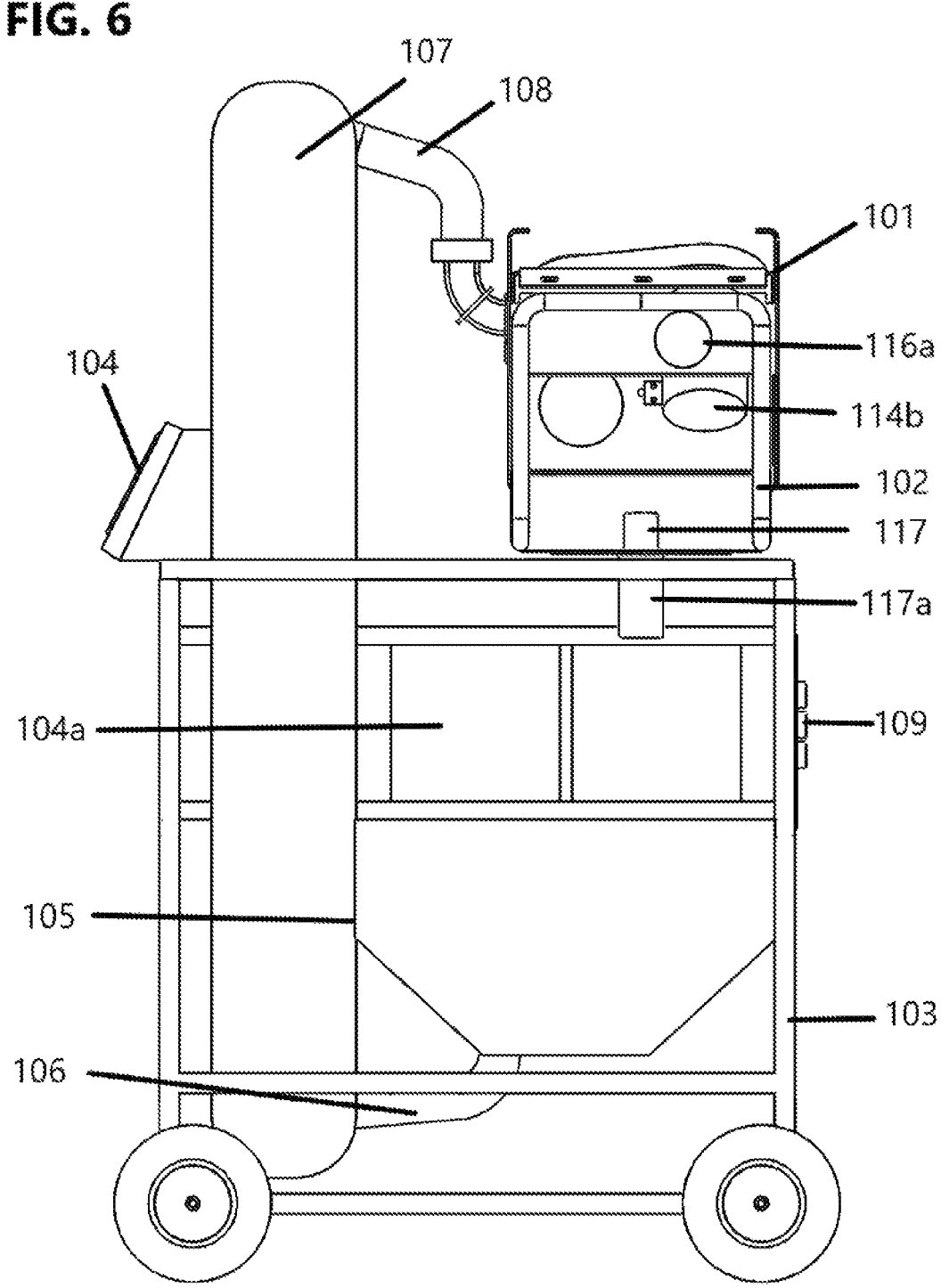
FIG. 6 is a side view of a pitching machine according to an embodiment of the present invention.
Figure 7:
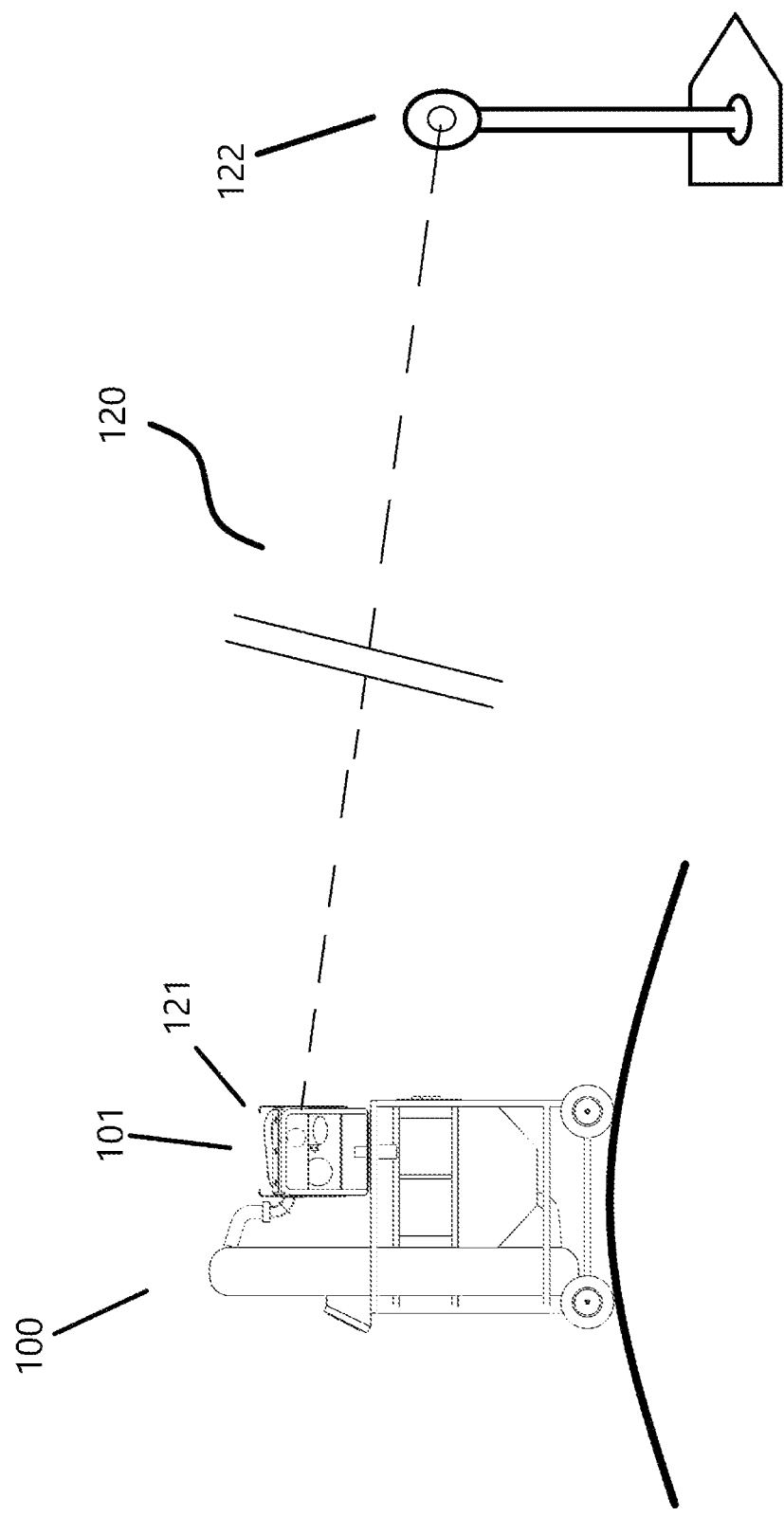
FIG. 7 is a side view of a calibration procedure according to an embodiment of the present invention.
Figure 8:
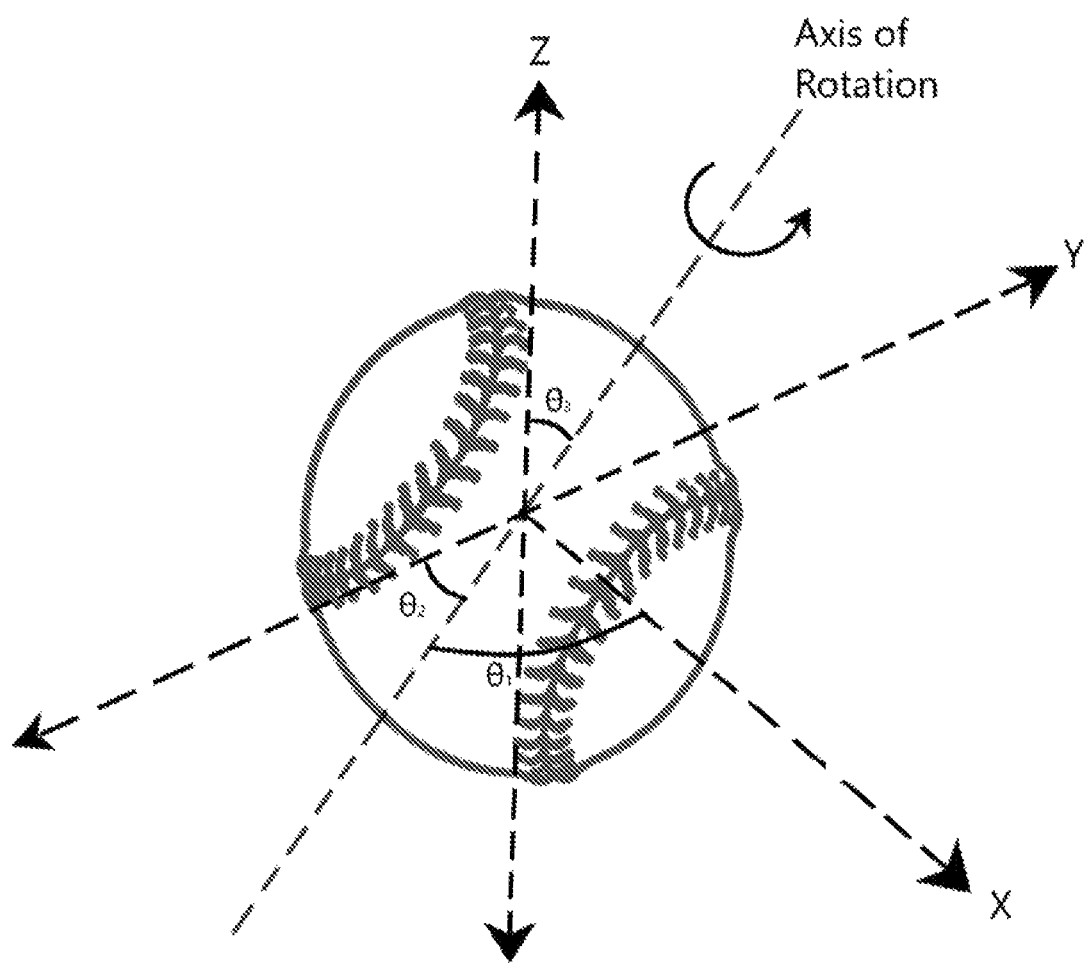
FIG. 8 provides an exemplary view of baseball motion and rotation during a pitch.

FIGS. 1-7 provide perspective, top, front, back, and side views of an exemplary pitching machine 100 according to the present invention. The pitching machine 100 includes a pitching assembly 101 that includes the components used to generate a pitch and deliver a ball to a target, a pitching assembly mount 102, a base structure 103 to which the pitching assembly mount 102 is attached, a control unit 104, a ball hopper 105 for storing balls, a delivery tube 106 for transferring balls from the hopper 105 to a ball elevator 107, a ball elevator 107 to raise and deliver balls to a feed chute 108, and a feed chute 108 to deliver balls into the pitching assembly 101. Additional components and elements are described below in detail.

The pitching assembly 101 includes the electrical and mechanical components that apply motion to balls delivered into the pitch assembly by the feed chute 108. The pitching assembly 101 may include a propulsion mechanism 110 that includes three rotating belts which may be spaced at 120° from each other around the propulsion path 115 of the ball passing through the propulsion mechanism (the "virtual tunnel"). The rotating belts 111a, 111b, and 111c are shown in the overhead view of FIG. 2. The portion of each belt spanning the length of the propulsion path of the ball may be in a range of about 8 inches to about 15 inches (any value or range of values therein, e.g., about 12 inches). The belts may be made of a slightly compressible materials to allow for a tight grip on the ball with a minimal amount of compression in the belt. For example, the belts may be made from vulcanized rubber, or other dense and durable polymer material. The diameter of the propulsion path 115 may be equal to or slightly less than the diameter of the ball to be thrown by the machine (e.g., a standard-sized baseball, standard-sized softball, or other type of sports ball). For example, the diameter of the propulsion path may have a diameter that is equal to the diameter of the ball or no more than about 2 mm smaller than the diameter of the ball.

Each of the rotating belts may be positioned on a driving pulley and an idler pulley. Rotating belt 111a is positioned on a driving pulley 112a and an idler pulley 113a, rotating belt 111b is positioned on a driving pulley 112b and an idler pulley 113b, and rotating belt 111c is positioned on a driving pulley 112c and an idler pulley 113c. Each of the driving pulleys may be rotatably connected to an electrical motor that drives rotation of the driving pulley, which in turn cycles the rotating belt over the driving pulley and the idler pulley. The driving pulley 112a is rotatably connected to a rotating axle of electrical motor 114a, the driving pulley 112b is rotatably connected to a rotating axle of electrical motor 114b, and the driving pulley 112c is rotatably connected to a rotating axle of electrical motor 114c. The electrical motors 114a, 114b, and 114c may be of various kinds of AC or DC motors that allow for variable and precise control of the rotational speed of the motor. The electromechanical motors 114a, 114b, and 114c may be in electronic communication with and controlled by the control unit 104. The speed of the variable speed electrical motors may be independently controlled by control unit 104, such that rotating belts 111a, 111b, and 111c may be cycled at different linear speeds when the pitching mechanism is delivering a pitch. Cycling the rotating belts 111a, 111b, and 111c at different pre-determined, closely controlled speeds allows the pitching mechanism to deliver pitches with different speeds to target, different rotational velocities, and consequently different flight paths.

The attitude (the pitch, along the xz plane on which the pitching machine and the target are located) and yaw (changes in which allow the pitch to target various lateral positions in a strike zone) of the pitching assembly 101 may also be adjusted to deliver a selected pitch precisely to a chosen target, such as a location in a standard strike zone or outside of the strike zone, depending on the objective of the operator. The pitching assembly 101 may be mounted to the pitching assembly mount 102 on a horizontal axle 116 that may be rotatably connected to the lateral walls or frame of the pitching assembly mount 102 via bearings or other structures. An electrical motor 116a may be mechanically connected to the horizontal axle 116 and may be operable to rotate the horizontal axle 116 in both rotational directions to adjust the attitude of the pitch. The electrical motor may be a servo motor to allow close control of the angular position (attitude) of the pitching assembly 101. In other embodiments, the electrical motor 116a may be another kind of electrical motor (e.g., a brushless DC motor) in combination with an angular position sensor or encoder. The electrical motor 116a and any associated electronics (e.g., sensors or encoders) may be in electronic communication with the control unit 104. The control unit 104 may provide electronic signals to the motor 116a to closely control the activation of the motor 116a and the attitude of the pitching assembly 101. The control unit 104 may continuously analyze and record position data of the motor 116a (in the case of a servo motor), and, in embodiments that include separate angular position sensors or encoders, receive data from the sensors or encoders to facilitate the analysis and recording of the position of the motor 116a.

The pitching assembly mount 102 may be rotatably connected to the base 103 of the pitching machine 100. The pitch assembly mount 102 may be positioned on a bearing between the pitching assembly mount 102 and an upper frame portion of the base 103, and a vertical axle 117 may rotatably connect the pitching assembly mount 102 to the upper frame portion of the base 103. The vertical axle 117 may be mechanically connected to an electrical motor 117a that may be operable to rotate the vertical axle 117 in both rotational directions to adjust the yaw (or yaw) of a pitch. The electrical motor may be a servo motor to allow close control of the angular position (attitude) of the pitching assembly 101. In other embodiments, the electrical motor 117a may be another kind of electrical motor (e.g., a brushless DC motor) in combination with an angular position sensor or encoder. The electrical motor 117a and any associated electronics (e.g., sensors or encoders) may be in electronic communication with the control unit 104. The control unit 104 may provide electronic signals to the motor 117a to closely control the activation of the motor 117a and the yaw of the pitching assembly 101. The control unit 104 may continuously analyze and record position data of the motor 117a (in the case of a servo motor), and, in embodiments that include separate angular position sensors or encoders, receive data from the sensors or encoders to facilitate the analysis and recording of the position of the motor 117a.

The base 103 may be a sturdy frame structure that is operable to maintain a position of the pitching machine without wobbling or tipping during the delivery of a pitch by the pitching assembly 101. The base 103 may be a quadrilateral structure with a relatively broad base for stability. It may have an open central area within the frame to house additional components of the pitching machine 100. A hopper 105 may be mounted within the frame of the base 103. The hopper 105 may be of sufficient size to provide a large number of balls (e.g., up to 100) to allow for continuous use for a substantial number of pitches without the need to reload the hopper 105. The hopper 105 may be manually loaded or, in some embodiments, may be paired with a ball conveying system operable to deliver balls to the hopper 105. The location of the hopper 105 in a lower portion of the base 103 may allow the operator to more easily fill the hopper 105, avoiding the need to lift balls or containers of balls at or above the shoulders.

The hopper 105 may include a motor-driven indexer wheel (not shown) at the bottom of the hopper 105 which may facilitate the feeding of balls into the delivery track or tube 106 that may feed balls to the ball elevator 107. The activation of the electrical indexer wheel motor may be controlled to load the delivery track 106 when the ball elevator 107 is active, thereby providing balls to the elevator 107 when balls are needed for the operation of the pitch assembly 101.

The ball elevator 107 may be operable to lift and deliver balls to the feed chute 108 during operation of the pitching machine. The ball elevator 107 may include a cycling conveying belt on a vertical or substantially vertical track. The conveying belt may be cycled around the track by one or more sprockets driven by an electric motor (e.g., an AC or DC motor) that is in electronic communication with the processing unit 104. The processing unit 104 may activate and de-activate the elevator 107 based on the activation of the pitching assembly 101 and one or more sensor signals indicating whether the pitching machine 100 is properly working. The ball elevator 107 may operate continuously while the pitching machine 100 is in use until the feed chute 108 is full. The feed chute 108 may include a proximity sensor at a proximal end thereof, adjacent to the propulsion mechanism. The proximity sensor may be positioned such that it detects the presence of a ball in the proximal-most position of the feed chute 108 to prevent wasted cycling of the ball elevator 107. The proximity sensor may be in electronic communication with the control unit 104 and may send a signal to the control unit when a ball is present in the proximal-most position in the feed chute 108. The control unit 108 may be programmed to de-activate the indexer wheel and the ball elevator 107 in response to the signal from the proximity sensor.

In some embodiments, the feed chute 108 may be a flexible tube structure that can be laterally and vertically stretched and moved without damage thereto in order to facilitate the attitude and yaw adjustments of the pitching assembly 101 for delivering various pitch types to various target locations. In other embodiments, the feed chute 108 may feed into a broad funnel that delivers balls into the propulsion mechanism such that balls delivered by the feed chute 108 are successfully delivered to the anterior portion of the feed chute 108 regardless of the attitude and yaw positions of the pitching assembly 101.

The control unit 104 of the pitching machine 100 may be in electronic communication with all electrical and electronic components of the pitching machine 100 (i.e., the various encoders and motors). The control unit 104 may include one or more processors operable to monitor and control the operation of the various electrical and electronic elements of the pitching machine 100. The control unit 104 may include a graphical display interface (e.g., a graphical touchscreen interface; a combination of a keyboard, mouse, and a video monitor, etc.) to allow a human operator to select the type of pitch to be thrown, the speed to target at which the pitch may be delivered, and the target location of the pitch. The control unit 104 is operable to control the variable speed electric motors 111*a*, 111*b*, and 111*c* of the pitching assembly 101 to adjust the velocity of each belt to enable the pitching machine 101 to pitch the ball to the target in a manner consistent with the pitch type and characteristics selected by the human operator. The control unit 104 may be a general purpose computer or server that further includes an operating system, computer readable memory, a wireless communication device (e.g., a radio frequency (RF) capable device) to enable wireless communication with one or more mobile computing devices and other wireless-enabled electronic devices, and other components. The control unit 104 may be programmed with pitching machine control software designed to control the pitching machine 100, including controlling the various motors of the pitching machine, receiving and interpreting data from sensors and/or servos included in the pitching machine, and generating pitches of different speeds to target, rotational velocities, and target locations. The control unit 104 may also be operable to store user-generated pitch records in a machine readable memory, to allow an operator to create and store various desired pitches. The control unit 104 may also be programmed to receive wireless data from one or more mobile computing devices that may include software designed to interact with the control unit 104 and allow an operator to select pitches and control the pitching machine 100 wirelessly. The electronic components of the control system may be housed in control unit housing 104*a*.

The control unit 104 may adjust the belt velocities of the pitching assembly 101 based on pitch selections made by the operator through the graphic display interface. The pitching machine control software may include a module operable to adjust the rotational speed of the variable speed motors 114*a*, 114*b*, and 114*c* based on the pitch characteristics selected by the operator. In some embodiments, the pitching machine control software may be programmed to calculate the belt velocity ratios needed to create a pitch based on the pitch characteristics selected by the operator, including the pitch type, the speed to target, arm angle, and the rotational velocity. Once the calculation is performed, the control unit 104 may adjust the individual belt velocities according to the programmed velocity ratios corresponding to the selected pitch type. For example, if the operator selects a "straight fastball", the control unit 104 may control the variable speed motors 114*a* and 114*b* to spin at a same speed that is slightly slower speed at which it directs the variable speed motor 114*c* to spin. Such a rotational velocity ratio between the motors 114*a*, 114*b*, and 114*c* will cause the two top belts 111*a* and 111*b* to have a slower linear velocity through the propulsion path 115 than the bottom belt 111*c*, resulting in the ball backspinning around a horizontal axis as it approaches the target.

In other embodiments, the control unit 104 may be pre-loaded with a database of speed ratios for generated particular pitches in a computer readable memory. In response to a pitch selection by the operator, the control unit 104 may retrieve the rotational velocity for each variable speed motor 114*a*, 114*b*, and 114*c* corresponding to the particular pitch chosen by the operator based on the selected speed to target and rotational velocity from a lookup table in a computer readable memory. The control unit 104 may then adjust the individual belt velocities according to the programmed velocity ratios corresponding to the selected pitch type.

The pitching machine control software of the control unit 104 may include pre-programmed range of target locations that are calibrated to cover selectable locations anywhere within a standard strike zone and a pre-determined area around the strike zone (the "addressable target area", such as an area covering up to 18 additional inches above, below, and to each side of the strike zone) at a pre-determined distance from the target (i.e., a standard distance from a pitching mound, such as 60.5 ft., 46 ft., or 43 ft.). The pitching machine control software may include a module operable to calculate the attitude and yaw of the pitching assembly 101 based on the characteristics of the selected pitch entered by the operator through the graphical display interface. In some embodiments, the attitude and yaw positions may be calculated based on a straight path between propulsion path 115 and the targeted location and the drop that will result from gravity between the pitching machine 100 and the target. In other embodiments, the attitude and yaw for a selected pitch may be calculated based on more variables, including the target location, gravity, the speed to target, the rotational velocity, and the rotational axis of the selected pitch. In response to a pitch selection and location selection by the operator, the control unit 104 may calculate attitude and yaw positions for the pitch and activate the attitude motor 116*a* and the yaw motor 117*a* to adjust the direction of the propulsion path 115 to correspond with the particular pitch and location chosen by the operator. In other embodiments, the attitude and yaw positions of the pitching assembly 101 corresponding to each selectable location may be stored in a database, and the attitude and yaw positions for the pitch may be selected from a lookup table in a computer readable memory. The control unit 104 may then adjust the attitude and yaw positions according to the programmed positions corresponding to the selected pitch type.

To enable the precise delivery of pitches to selected target location within the addressable target area, the position of the pitching machine 100 may be calibrated using a calibration system 120. The calibration system 120 may include at least one laser device 121 mounted on the pitching assembly 101 and a calibration target 122 that may be placed on the home plate to which the operator intends to deliver pitches. In some embodiments, the operator may calibrate the orientation of the pitching assembly 101 by adjusting the attitude and yaw of the pitching assembly 101 until a laser produced by the laser device 121 strikes the calibration target 122. The pitching machine control software may include a calibration module that allows the operator to adjust the attitude and yaw of the pitching assembly 101 incrementally through selectable commands provided on the graphical display interface of the control unit 104. When the operator has successfully oriented the pitching assembly 101 such that the laser strikes the calibration target 122, the operator can input a calibration command, indicating to the control unit 104 that its current position is a centered point of reference that it can use to calculate accurate target locations within the addressable target area.

In other embodiments, the calibration system 120 may include a stationary laser device 121a mounted on the base 103. In such embodiments, the pitching machine may include mechanical height and tilt adjustment devices in the base 103 to orient the pitching assembly such that the laser emitted from the stationary laser device 121a strikes the calibration target 122. Once the base 103 is properly positioned, the pitching assembly 101 may be properly oriented and pitching machine 100 may be activated and used.

The pitching machine control software may also allow the operator to create, test, and save pitches into a library in a computer readable memory of the control unit 104. The graphical display interface may be operable to command the processing unit to store user-generated pitch records as retrievable data in the readable memory, such that the operator can build a library of pitches to use in training batters and/or catchers, including building pitch sequences from the user-generated pitch records. All of the characteristics entered by the operator may be included in the user-generated pitch record. Once stored in memory, a user-generated pitch record is selected from the database through the graphical display interface of the control unit 104. Additionally, the pitching machine control software may be programmed to allow the operator to build pitch sequences of various numbers from user-generated pitch records and save the pitch sequences in the computer readable memory of control unit 104 to allow the operator reuse the pitch sequences as desired. The graphical display interface may be operable to command the processing unit to store specific pitch sequences as retrievable data in the memory. The pitching machine control software may also be programmed to generate random pitch sequences from the user-generated pitch records.

In some embodiments, the pitching machine control software may be operable to generate a random pitch sequence within parameters selected by the operator through the graphical display interface of the control unit. The pitching machine control software may include a selectable module that allows the operator to select (1) a set of 1 or more pitch types, (2) a range of speeds to target for each pitch type, (3) a range of rotational velocities for each pitch type, (4) specific target areas within the selectable range, (5) simulated arm angle, and (6) the number of pitches in the sequence. The pitching machine control software may randomly make selections from the selected ranges in a stepwise manner. For example, and without limitation, the pitching machine control software may first select the pitch type from the selected options, then the speed to target, the rotational velocity, the target location, and the simulated arm angle in order. It is to be understood that the order of selection from the user input parameters may vary, except that the pitch type must be selected before the speed to target and rotational velocity. With regard to selecting a range of target locations, the pitching machine control software may allow the operator to select one or more two-dimensional areas (sub-regions) within the addressable target area to which the pitching assembly is operable to deliver a pitch.

The pitching machine may further include a signaling system 109 that includes visual and/or audio signal emitters to alert a human operator of one or more operating conditions of the pitching machine. The signaling system 109 is operable to alert a batter or catcher that a pitch will be imminently delivered by the pitching machine. The signaling system 109 may comprise a plurality of lights wherein each light of the plurality of lights comprises a different color, enabling the signaling system to provide a plurality of different visual signals to a batter or catcher.

The pitching machine of the present invention may be operable to deliver many different kinds of pitches in any selectable location in and closely around a strike zone with precision, thereby providing a realistic pitching simulator that will allow for more effective training applications than are achievable with conventional pitching machines. The pitching machine 100 and other embodiments described herein are exemplary, and does not limit the scope of the invention. It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. A pitching machine, comprising:
   a. a pitching assembly having
      a propulsion mechanism having at least three independently controlled propulsion belts each with a flat contact surface arranged equilaterally around a substantially closed circular propulsion path having a pre-determined size that is substantially equal to a sports ball and results in a single point contact between said sports ball and each of said belts;
   b. a base on which the pitching assembly is mounted; and
   c. a control unit operable to independently control the cycling velocity of said at least three independently controlled propulsion belts.

2. The machine of claim 1, further comprising a substantially horizontal axis of rotation allowing an attitude of the pitching assembly to be adjusted and a substantially horizontal axle member that allows said pitching assembly to rotate on said substantially horizontal axis.

3. The machine of claim 2, further comprising a horizontal axle motor in mechanical communication with said substantially horizontal axle member and operable to rotate said axle member to adjust the attitude of said pitching assembly.

4. The machine of claim 1, further comprising a substantially vertical axis of rotation allowing the yaw of the pitching assembly to be adjusted and a substantially vertical axle member that allows said pitching assembly to rotate on said substantially vertical axis.

5. The machine of claim 4, further comprising a vertical axle motor in mechanical communication with said substantially vertical axle member and operable to rotate said axle member to adjust the yaw of said pitching assembly.

6. The machine of claim 1, further comprising three belt driving motors, each in mechanical communication with one of said propulsion belts and operable to cycle said propulsion belts at independent speeds, wherein said three belt driving motors are in electronic communication with said control unit.

7. The machine of claim 6, wherein said control unit comprises a graphic display interface, and further comprising control unit software operable to display a menu of pitch characteristics on said graphic display interface and to receive selections made by a human operator through said graphic display interface.

8. The machine of claim 7, wherein said control unit software is operable to direct a processing unit of said control unit to activate said belt driving motors to cycle said propulsion belts at independent speeds in accordance with pitch characteristics selected by said human operator.

9. The machine of claim 7, wherein said pitch characteristics include one or more of pitch type, speed to target, rotational velocity, simulated arm angle, and target location.

10. The machine of claim 7, further comprising a mobile computing device in wireless electronic communication with said control unit, said mobile computing device having a second pitching machine control software.

11. The machine of claim 1, further comprising a calibration system including a laser emitting device and a calibration target, wherein the laser emitting device is mounted on said pitching assembly, and said calibration target is configured to be placed at a center of a target location.

12. An apparatus for projecting balls, comprising:
 a. a propulsion system comprising at least three belts oriented around a propulsion path, said belts are each coupled with a driving wheel and have a flat contact surface that results in a single point contact between each of said belts and a sports ball passing through the propulsion path, wherein each of said driving wheels is mechanically connected to an independently controlled driving motor;
 b. a control unit in electronic communication with each of said independently controlled driving motors, and operable to control each of said independently controlled driving motors to rotate the corresponding driving wheel at independently determined rotational velocities; and
 c. a control software operable to allow a human operator to select a plurality of pitch characteristics, and provide computer readable instructions to a processing unit of said control unit, said control unit being operable to activate said independently controlled driving motors to rotate said driving wheels in accordance with the pitch characteristics selected by said operator.

13. The apparatus of claim 12, wherein the propulsion path is at least six inches in length and each of said three belts run along the entire length of the propulsion path.

14. The apparatus of claim 13, wherein said belts are spaced apart from one another along the propulsion path to create a substantially closed circular propulsion path having a diameter about equal to the diameter of a standard-sized sports ball.

15. The apparatus of claim 12, further comprising an orientation system operable to orient said pitching assembly such that the propulsion path is positioned to deliver a ball to a specific target location in a pre-defined area.

16. The apparatus of claim 15, wherein said orientation system includes a first axial rotation mechanism for rotating the pitching assembly around a substantially horizontal axis such that the pitching assembly can be adjusted to different attitudes in accordance with said plurality of pitch characteristics selected by the operator, and an horizontal axis motor in mechanical communication with the substantially horizontal axis mechanism for rotating said pitching assembly.

17. The apparatus of claim 15, wherein said orientation system includes a second axial rotation mechanism for rotating the pitching assembly around a substantially vertical axis such that the pitching assembly can be adjusted to different yaws in accordance with said plurality of pitch characteristics selected by the operator, and a vertical axis motor in mechanical communication with the substantially vertical axis mechanism for rotating said pitching assembly.

18. A method of delivering pitches from a pitching machine to a batter or catcher, comprising:
 a. translating user selected plurality of desired pitch characteristics into machine readable instructions for execution by a processor of a control unit;
 b. activating a plurality of propulsion belt driving motors in accordance with said machine readable instructions, each of said propulsion belt driving motors being in mechanical communication with one of three propulsion belt each having a flat contact surface and the three propulsion belts being arranged equilaterally around a closed propulsion path for propelling a ball toward a target area, wherein said control unit is operable to activate each of said plurality of belt driving motors to cycle each of said three propulsion belts at independent velocities; and
 c. delivering said ball into said propulsion path to be contacted by said three propulsion belts and propelled through the propulsion path, out of said pitching machine, and toward said target area.

19. The method of claim 18, wherein said pitching machine includes an orientation system with a first axial rotation mechanism for rotating the pitching assembly around a substantially horizontal axis such that the pitching assembly can be adjusted to different attitudes in accordance with said plurality of pitch characteristics selected by an operator, and an horizontal axis motor in mechanical communication with the substantially horizontal axis mechanism for rotating said pitching assembly.

20. The method of claim 19, wherein said computer readable instructions include instructions for adjusting an attitude of said pitching assembly, and further comprising said control unit activating a horizontal axis motor to adjust the attitude of said pitching assembly by pivoting said pitching assembly on a substantially horizontal axis.

21. The method of claim 19, wherein said orientation system includes a second axial rotation mechanism for rotating the pitching assembly around a substantially vertical axis such that the pitching assembly can be adjusted to different yaws in accordance with said plurality of pitch characteristics selected by the operator, and a vertical axis motor in mechanical communication with the substantially vertical axis mechanism for rotating said pitching assembly.

22. The method of claim 21, wherein said computer readable instructions include instructions for adjusting a yaw of said pitching assembly, and further comprising said control unit activating a vertical axis motor to adjust the yaw of said pitching assembly by pivoting said pitching assembly on a substantially vertical axis.

23. The method of claim 22, further comprising using a graphical display interface to select said plurality of desired pitch characteristics, wherein said pitch characteristics include one or more of pitch type, speed to target, rotational velocity, simulated arm angle, and target location.

24. The method of claim 23, wherein said pitching machine control software calculates the operational speed of said propulsion belt drive motors, an attitude of the pitching assembly, and a yaw of the pitching assembly in accordance with the pitch type, the speed to target, the rotational velocity, the simulated arm angle, and the target location.

25. The method of any of claim 24, further comprising saving said selected plurality of desired pitch characteristics as a user-generated pitch record in a machine readable memory.

26. The method of claim 18, wherein said propulsion path has a pre-determined size that is substantially equal to a sports ball and results in a single point contact between said sports ball and each of said belts.

* * * * *